(12) United States Patent
Yamada et al.

(10) Patent No.: US 8,547,011 B2
(45) Date of Patent: Oct. 1, 2013

(54) LAYERED PRODUCT, LUMINESCENCE DEVICE AND USE THEREOF

(75) Inventors: Yasumi Yamada, Tokyo (JP); Motofumi Kashiwagi, Tokyo (JP)

(73) Assignee: Zeon Corporation, Tokyo (JP)

( * ) Notice: Subject to any disclaimer, the term of this patent is extended or adjusted under 35 U.S.C. 154(b) by 1275 days.

(21) Appl. No.: 11/579,083

(22) PCT Filed: Apr. 27, 2005

(86) PCT No.: PCT/JP2005/008040
§ 371 (c)(1),
(2), (4) Date: Oct. 30, 2006

(87) PCT Pub. No.: WO2005/105428
PCT Pub. Date: Nov. 10, 2005

(65) Prior Publication Data
US 2008/0018230 A1    Jan. 24, 2008

(30) Foreign Application Priority Data

| Apr. 28, 2004 | (JP) | 2004-132561 |
| Apr. 28, 2004 | (JP) | 2004-133606 |
| May 7, 2004 | (JP) | 2004-139174 |
| May 11, 2004 | (JP) | 2004-141187 |

(51) Int. Cl.
    *H01J 9/26* (2006.01)
    *H01J 9/32* (2006.01)
    *H01J 1/62* (2006.01)
    *H01J 63/04* (2006.01)
    *B32B 9/00* (2006.01)
    *B32B 19/00* (2006.01)

(52) U.S. Cl.
    USPC .............. 313/504; 428/689; 428/917; 445/25

(58) Field of Classification Search
    USPC ................. 313/504, 112, 116, 113, 114, 498, 313/506, 512; 257/98, 88; 428/690, 917, 428/119, 201; 252/301.16
See application file for complete search history.

(56) References Cited

U.S. PATENT DOCUMENTS

| 2002/0061418 A1* | 5/2002 | Imanishi | 428/690 |
| 2002/0125822 A1* | 9/2002 | Graff et al. | 313/506 |

(Continued)

FOREIGN PATENT DOCUMENTS

| JP | 2002-273836 A | 9/2002 |
| JP | 2003-48271 A | 2/2003 |

(Continued)

OTHER PUBLICATIONS

Machine translation of JP 2002-273836.*

(Continued)

*Primary Examiner* — Anh Mai
*Assistant Examiner* — Zachary J Snyder
(74) *Attorney, Agent, or Firm* — Birch, Stewart, Kolasch & Birch, LLP

(57) ABSTRACT

A layered product comprising: sealing film comprising a laminate of at least one organic film and at least one inorganic film, and transparent resin substrate; in which the organic film is made from fluorine compound or alicyclic structure containing polymer and metallic simple substance or metallic compound as raw material, and in which the inorganic film is made from metallic simple substance or metallic compound as raw material. A luminescence device comprising: substrate, and lower electrode layer, luminescent-material layer, upper electrode layer and sealing film which are laminated in turn on the substrate; in which the substrate and the sealing layer comprises the layered product.

12 Claims, 5 Drawing Sheets

(56) References Cited

U.S. PATENT DOCUMENTS

2004/0058157 A1   3/2004   Ishikawa
2005/0048313 A1*  3/2005   Sotoyama ................ 428/690

FOREIGN PATENT DOCUMENTS

JP   2003-231202 A   8/2003
JP   2004-237655 A   8/2004

OTHER PUBLICATIONS

Machine translation of Jp Publication 2002-321311 to Nakagawa et al. included.*
Machine translation of JP 2003-326634 to Shiho et al. Published Nov. 19, 2003.*
STIC search results.*

* cited by examiner

LAYERED PRODUCT, LUMINESCENCE DEVICE AND USE THEREOF

TECHNICAL FIELD

The invention relates to a layered product which can intercept oxygen, water vapor or so on, a luminescence device such as organic electroluminescence device (thereafter, "organic EL device"), and use thereof.

BACKGROUND ART

Gas barrier film is noticed as not only wrapping material for foods or medicine but also substrate of electronics devices, as the film is good in thinness, lightness and flexibility. Particularly, the film is noticed as the substrate for liquid crystal display or organic EL display which is looked for application to wall-hanging television or electronic paper. The gas barrier film is usually obtained by laminating gas-barrier layer on a transparent resin film substrate.

There are various suggestions concerning the gas-barrier layer. For instance, in patent document 1 or patent document 2 is described gas barrier film comprising an alternate laminate of inorganic films comprising inorganic oxide such as $SiO_2$ and $Al_2O_3$, and films comprising resin such as polyarylate and polyacrylate. But, as the result of our review, the film has low adhesion between resin film and inorganic film, so we found that both films are easily peeled off. This peel-off may easily bring about a defect such as crack in the inorganic film, being to lower gas barrier property. The film comprising resin such as polyarylate and polyacrylate is high in water absorption, which results in releasing of water vapor and so on from the resin film when the inorganic film is formed, being to lower density of the inorganic film. Not less than eight layers of the inorganic film and the resin film are required to be enough gas barrier property, so it is dissatisfied with productivity thereof.

As other example, in patent document 3 is described to use hydrocarbon polymer having alicyclic structure for an organic film in gas barrier layered product of inorganic film and the organic film. As the polymer has low water absorption and little or no gas release, the polymer is considered to be favorable for the organic film of the above layered product. As the result of our review, however, use of only means for resolution described in patent document 3 is to result in insufficiency of adhesion between resin film and inorganic film yet.

On the other hand, organic EL device is looked for application to display such as segment display, dot-matrix display and liquid crystal display, or light source. There are organic EL device having SH-A structure that positive hole transport layer and luminescent-material layer are formed between hole injection electrode as electrode and electron injection electrode as negative electrode; organic EL device having SH-B structure that luminescent-material layer and electron transport layer are formed between positive hole injection electrode and electron injection electrode; organic EL device having DH structure that positive hole transport layer, luminescent-material layer, and electron transport layer are formed between positive hole injection electrode and electron injection electrode, as example of organic EL device.

In any structure of the organic EL devices, organic EL device works by principle that positive hole injected from positive hole injection electrode (positive electrode) and electron injected from electron injection electrode (negative electrode) are recombinated in interface of luminescent-material layer and positive hole (or electron) transport layer and in luminescent-material layer to emit light. Therefore, against an inorganic EL device having luminescence mechanics by collision excitation, an organic EL device has a feature which light can be emitted with low voltage and it is favorable for luminescence device in the future.

Example of structure of typical EL device is shown in FIG. 1. The organic EL device shown in FIG. 1 comprises transparent substrate 16, lower electrode layer 54, luminescent-material layer 62 and upper electrode layer 55. A conventional organic EL device having bottom emission mode, which light radiated in the luminescent-material layer 62 is sent out on the side of the transparent substrate 16, is small in an emission area, as a thin film transistor is put on the side of the transparent substrate. Top emission mode, which light radiated in the luminescent-material layer 62 is sent out on the opposite side of the transparent substrate 16 in view of the luminescent-material layer 62, can give enough area for emission, so it is looked recently.

However, in an organic EL device, using of material for negative electrode being low in work function easily causes the negative electrode to be corroded or oxidized by reacting with water-vapor or oxygen in air. This degradation of the negative electrode results in sprouting non-emission region called as "dark spot" in the luminescent-material layer, causing organic EL device to degrade in the property by aging.

Not only the material used in negative electrode, but also organic material used in luminescent-material layer, transport layer and so on is changed in structure by reacting with water-vapor or oxygen, which results in enlarging dark spot likewise.

In order to enhance endurance or reliability of organic EL device, organic EL device whole requires a seal to prevent organic material used in negative electrode, luminescent-material layer or transport layer from reacting with water-vapor or oxygen.

As to sealing of organic EL device, patent document 4 discloses the forming method of film of $Si_3N_4$, diamond like carbon or the like on the external surface of the organic EL device by ECR plasma CVD method. In the document is described that oxidization of electron injection electrode (negative electrode) can be prevented, and water-vapor resistance of the organic EL device can be improved by the forming method. But, the film made of the above material needs large thickness for improvement of water-vapor resistance, which causes elevating internal strain easily to make crack in film, being likely to reduce the sealing performance by contraries.

Patent document 5 discloses a method of sealing an organic EL device with a layered product of organic matter and silicon oxynitride. According to the method, an organic EL device having high reliability can be obtained by setting a close protection part having a thickness, which can prevent water-vapor, oxygen and so on from going in from outside and can completely restrain enlargement of dark spot, on the upper of the organic EL device. But, adhesion between organic matter and silicon oxynitride is extremely low without limitation of chemical structure or film making method, so the peel-off brings about defect in an interface to lower sealing property.

Also, the applicant has suggested, in patent document 6, a sealing film for organic EL device comprising decomposition polymer of per-fluoro olefin. According to the document, degradation of organic EL device by oxygen or water-vapor in outside can be restrained, so the device becomes so efficient and effective for producing light, and suitable to downsize or thin the device. But, applying of the decomposition polymer alone on the organic EL device results in having yet been insufficient sealing property, so it needs more improvement.

[Patent Document 1] JP-A-2003-206361
[Patent Document 2] JP-A-2003-48271
[Patent Document 3] JP-A-2002-234103
[Patent Document 4] JP-A-H10-261487
[Patent Document 5] JP-A-2002-25765
[Patent Document 6] JP-A-2002-56971

DISCLOSURE OF THE INVENTION

Subject to be Solved by the Invention

An object of the invention is to provide a layered product having a good water-vapor barrier property and good scratch resistance, and moreover an object of the invention is to provide a luminescence device such as a organic EL device having a good steam barrier property, good scratch resistance and long life of light emission, and to provide a device comprising the luminescence device.

Means for Solving the Subject

Inventors carried out every research in order to solve the subject. As a result, the inventors found out that the object is achieved by employing a sealing layer or a sealing film comprising an organic film made from metallic simple substance or metallic compound and fluorine compound or alicyclic structure containing polymer as raw material, more preferably by forming a sealing film comprising a laminate of organic film and inorganic film, in which the organic film is made from metallic simple substance or metallic compound and fluorine compound or alicyclic structure containing polymer as raw material, and the invention was made on the found out knowledge.

The invention provides (1) A layered product comprising:
a sealing film comprising a laminate of at least one organic film and at least one inorganic film, and
a transparent resin substrate;
in which the organic film is made from
fluorine compound or alicyclic structure containing polymer and
metallic simple substance or metallic compound as raw material, and
the inorganic film is made from
metallic simple substance or metallic compound as raw material.

The invention provides preferable modes as:

(2) The above layered product, in which the organic film is made from fluorine compound and metallic simple substance or metallic compound as raw material, and has a volume ratio of fluorine atom {F}/metal atom {M} being 0.01 to 0.99.

(3) The above layered product, in which the organic film is made from alicyclic structure containing polymer and metallic simple substance or metallic compound as raw material, and has a volume ratio of metal atom {M}/carbon atom {C} being 0.01 to 0.99.

(4) The above layered product, in which the organic film has water absorption of no more than 0.1% by weight. and (5) The above layered product, in which the transparent resin substrate is film comprising alicyclic structure containing polymer.

The invention provides (6) A luminescence device comprising: lower electrode layer, luminescent-material layer, upper electrode layer and sealing layer which are laminated in turn on a substrate;
in which at least one of the substrate and the sealing layer comprises the above layered product.

(7) A luminescence device comprising: lower electrode layer, luminescent-material layer, upper electrode layer and sealing film which are laminated in turn on a substrate;
in which the substrate comprises the above layered product, and
in which the sealing film comprises a laminate of at least one organic film and at least one inorganic film; in which the organic film is made from fluorine compound or alicyclic structure containing polymer and metallic simple substance or metallic compound as raw material, and the inorganic film is made from metallic simple substance or metallic compound as raw material. and (8) A luminescence device comprising: lower electrode layer, luminescent-material layer, upper electrode layer and sealing film which are laminated in turn on a substrate;
in which the sealing film comprises a laminate of at least one organic film and at least one inorganic film; in which the organic film is made from fluorine compound or alicyclic structure containing polymer and metallic simple substance or metallic compound as raw material, and the inorganic film is made from metallic simple substance or metallic compound as raw material.

The invention provides as preferable mode of the luminescence element (9) The above luminescence device, of which light transmission within the range of 400 to 800 nm in a wave length is 80% or more during no light emission.

Also the invention provides

(10) A luminescence device comprising: lower electrode layer, luminescent-material layer, upper electrode layer and sealing layer which are laminated in turn on a substrate;
in which the sealing layer is made from fluorine compound and metallic compound as raw material,
in which relationship among refractive index $n_E$ of the upper electrode layer, refractive index n of the sealing layer and refractive index $n_A$ of outside atmosphere of the sealing layer is $n_E > n > n_A$.

Provided as the preferable luminescence device are

(11) The above luminescence device, in which the film made from fluorine compound and metallic compound as raw material comprises polymer of fluorine compound and metallic compound.

(12) The above luminescence device, in which the sealing layer comprises a laminated film made from fluorine compound and metallic compound as raw material,
having relationship of $n_E > n_1 > n_2 > \ldots > n_X > n_A$, where each refractive index of layers in the laminated film is represented as $n_1, n_2, \ldots$, and $n_X$ in order of nearness from the upper electrode layer, in which x is number of the layers.

(13) The above luminescence device, in which each layer of the laminated film, which is made from fluorine compound and metallic compound as raw material, comprises polymer of fluorine compound and metallic compound. and

(14) The above luminescence device, in which the sealing film or the sealing layer has water vapor transmission rate of 0.1 $g/m^2/24$ hr or less.

Moreover, the invention provides

(15) A plane light-source in which the above luminescence device is installed.

(16) A dot matrix display in which the above luminescence device is installed. and

(17) A liquid crystal display in which the above luminescence device is installed as a back-light unit.

Effects of the Invention

The layered product in the invention has a good water vapor barrier property, and good scratch resistance, which can be favorably employed for not only a wrapping material but also a sealing layer of electronics devices such as a luminescence device represented by an organic EL device.

Also the layered product in the invention is little in reflection loss, high in efficiency of light production, long in life of light emission, good in water vapor barrier property and good in scratch resistance of the surface, which can be favorably employed for a back light unit or a plane light-source of a segment display, dot matrix display, and liquid crystal display.

BEST MODE FOR CARRYING OUT THE INVENTION

Figure 1:
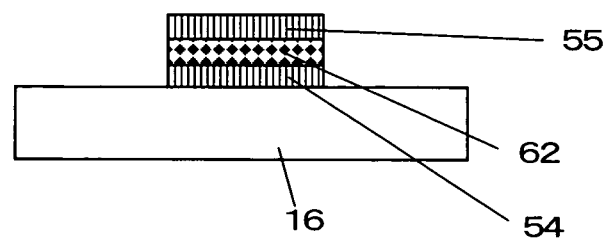
FIG. 1: cross section of a structure example of a typical organic EL device.

A layered product in the invention comprises a sealing film comprising a laminate of at least one organic film and at least one inorganic film, and a transparent resin substrate. And the organic film is made from fluorine compound or alicyclic structure containing polymer and metallic simple substance or metallic compound as raw material, and the inorganic film is made from metallic simple substance or metallic compound as raw material.

The organic film comprised in the layered product in the invention is a film made from fluorine compound or alicyclic structure containing polymer and metallic simple substance or metallic compound as raw material.

The fluorine compound as raw material for the organic film is an organic compound containing fluorine atom in a molecule. As organic fluorine compound are mentioned fluorocarbon compound, and fluorohydrocarbon compound. Though there are chain and circle in structure of these compound, the compound is not limited by the structure.

Fluorocarbon compound is saturated or unsaturated compound consisting of fluorine atom and carbon atom. The number of carbon in the Fluorocarbon compound is preferably 1 to 8, more preferably 1 to 7.

As saturated fluorocarbon compound are mentioned tetrafluoromethane, hexafluoroethane, octafluoropropane, decafluorobutane, dodecafluoropentane and so on.

As unsaturated fluorocarbon compound are mentioned unsaturated fluorocarbon compound having two carbons such as tetrafluoroethylene; unsaturated fluorocarbon compound having three carbons such as hexafluoropropene, tetrafluoropropyne, tetrafluorocyclopropene, unsaturated fluorocarbon compound having four carbons such as hexafluoro-2-butyne, hexafluoro-1-butyne, hexafluorocyclobutene, hexafluoro-1,3-butadiene, hexafluoro-(1-methylcyclopropene), octafluoro-1-butene, octa-fluoro-2-butene, unsaturated fluorocarbon compound having five carbons such as octafluoro-1-pentyne, octafluoro-2-pentyne, octafluoro-1,3,-pentadiene, octafluoro-1,4-pentadiene, octa-fluoro-cyclopentene, octafluoro-isoprene, hexafluorovinyl-acetylene, octafluoro-(1-methylcyclobutene), octafluoro-(1,2-dimethylcyclopropene), unsaturated fluorocarbon compound having six carbons such as dodecafluoro-1-hexene, dodecafluoro-2-hexene, dodecafluoro-3-hexene, decafluoro-1,3-hexadiene, deca-fluoro-1,4-hexadiene, decafluoro-1,5-hexadiene, decafluoro-2,4-hexadiene, decafluorocyclohexene, hexafluorobenzene, octafluoro-2-hexyne, octafluoro-3-hexyne, octafluorocyclo-1,3-hexadiene, octafluorocyclo-1,4-hexadiene, unsaturated fluorocarbon compound having seven carbons such as undecafluoro-1-heptene, undecafluoro-2-pentene, undecafluoro-3-heptene, dodeca-fluoro-cycloheptene.

Fluorohydrocarbon is saturated or unsaturated compound consisting of carbon atom, fluorine atom and hydrogen atom. The number of carbon in the fluorohydrocarbon is preferably 1 to 8, more preferably 1 to 7.

As saturated fluorohydrocarbon compound is mentioned a compound represented by formula: $C_xH_yF_z$ (x, y, and z are integer, x=1 to 7, y+z=2x+2 where fluorohydrocarbon is chain molecule, y+z=2x where fluorohydrocarbon is cyclic molecule). Specifically, trifluoromethane, difluoromethane, trifluoro-ethane, tetrafluoroethane, pentafluoropropane, hexafluoro-propane, heptafluoropropane; hexafluorocyclopropane, octafluorocyclobutane, decafluorocyclopentane and so on are mentioned.

As unsaturated fluorohydrocarbon compound is mentioned a compound represented by formula: $C_xH_yF_z$ (x, y, and z are integer, x=1 to 7, y+z=2x where fluorohydrocarbon compound is chain molecule, y+z=2x−2 where fluorohydrocarbon compound is cyclic molecule). Specifically, difluoroethylene, trifluoroethylene, difluoropropene, trifluoropropene, tetrafluoropropene, pentafluoropropene, hexafluoropropene, hexafluorobutene, octafluorobutene; difluorocyclopropene, trifluorocyclopropene, difluorocyclobutene, trifluoro-cyclobutene, tetrafluorocyclobutene, pentafluorocyclobutene and so on are mentioned.

In these, unsaturated fluorocarbon compound or unsaturated fluorohydrocarbon compound is preferable, unsaturated fluorocarbon compound is more preferable, in view of facility of polymerization or height in a speed for making film.

The fluorine compound may comprise a little inorganic compound containing fluorine atom. As the inorganic compound containing fluorine atom, a fluoride of alkali metal or alkaline earth metal is mentioned, and $BaF_2$, $CaF_2$, $MgF_2$, $LiF$ and so on are particularized. The fluorine containing inorganic compound is used preferably not more than 20% by weight, more preferably not more than 10% by weight in the used fluorine compound.

Alicyclic structure containing polymer as raw material for the organic film is polymer having saturated alicyclic hydrocarbon (cyclo-alkane) structure or unsaturated alicyclic hydrocarbon (cyclo-alkene) structure. In view of mechanical strength, heat resistance and so on, a polymer having cycloalkane structure is preferable. The number of carbon atom comprised in the alicyclic structure is not particularly limited, usually 4 to 30, preferably 5 to 20, more preferably 5 to 15, which results in high well-balanced property among mechanical strength, heat resistance, and so on. The alicyclic structure containing polymer used in the invention is not particularly limited by portion of a repeating unit having alicyclic structure therein, but it is favorable in view of transparency and heat resistance that the alicyclic containing polymer is preferably not less than 30% by weight, more preferably not less than 50% by weight, particularly preferably not less than 70% by weight, most preferably not less than 90% by weight in portion of the repeating unit having alicyclic structure based on total repeating unit of the alicyclic structure containing polymer.

As alicyclic structure containing polymer are mentioned (1) norbornene based polymers, (2) polymers comprising cycloolefine having single circle, (3) cyclic conjugated diene based polymer, (4) vinyl alicyclic hydrocarbon polymer, and hydrogenated polymer thereof or the like. In these, norbornene based polymer is preferable in view of transparency and moldability.

Metallic simple substance or metallic compound as another raw material for the organic film is simple substance or compound comprising metal or semi-metal element in the 4th to 16th groups on the periodic table. As the compound are mentioned organic compound, oxide, nitride, oxynitride, halogenide and so on. In these, simple substance or compound comprising metal or semi-metal element in the 4th group, the 13th group, or the 14th group is preferable, organic aluminum compound or organic silicon compound is particularly preferable.

As organic aluminum compound are mentioned complex compounds such as tri(iso-propoxide)aluminum, tri(ethoxy) aluminum, aluminum butoxide, aluminum phenoxide; aluminum acetylacetonate, aluminum ethyl acetoacetate, aluminum methacrylate, aluminum pentane dionate, and the like.

As organic silicon compound are mentioned organic mono silane compound such as tetramethoxy silane, tetraethoxy silane, methyltrimethoxy silane; organic polysilane compound such as hexamethyl disilane, 1,2-diphenyl tetra-methyl disilane, hexa-methoxy disilane; organic siloxane compound such as hexa-methyl disiloxane, tetramethyl disiloxane; organic silazane compound such as tetramethyl disilazane, hexamethyl disilazane, and the like.

The organic film is not particularly limited by a film forming method. For instance, coating process, vapor deposition process, sputtering process, CVD (chemical vapor deposition) process and so on are mentioned as the film forming method where alicyclic structure containing polymer is employed as one of the material comprised in the organic film. Vapor deposition process, sputtering process, CVD (chemical vapor deposition) process and so on are mentioned where fluorine compound is employed as one of the material comprised in the organic film.

In the coating process, into solution of alicyclic structure containing polymer is added fine particle of metal simple substance or metallic compound, is mixed and dispersed to obtain a paint, the paint is applied and dried to form a film. A particle diameter of the fine particle mixed and dispersed in the polymer solution is not particularly limited unless optical property is ruined, and the particle diameter is preferably 1 μm or less, more preferably 50 nm or less.

In the film forming method by a dry process such as vapor deposition process, sputtering process, and CVD process, metal simple substance or metallic compound, and fluorine compound or alicyclic structure containing polymer are evaporated and deposited on the substrate to form a film.

In the dry process, CVD process is preferable, plasma CVD process is particularly preferable because of the easiest method. The manner for plasma CVD process is not particularly limited, for instance there are a manner described in JP-A-H9-237783 and so on. As a device used in plasma CVD process, though parallel flat plate type CVD device is usually used, micro wave CVD device, ECR-CVD device, and high density plasma CVD device (Helicon wave excited plasma, inductively coupled plasma) or so on may be used.

As one manner for plasma CVD process, first, a substrate on which organic film are going to be deposited is set in chamber of CVD device. And air in the chamber of CVD device is exhausted to depressurize the chamber to 0.1 Pa or less, then metal simple substance or metallic compound, and fluorine compound or alicyclic structure containing polymer as raw material are introduced into the chamber.

The manner of introducing depends on sort of the raw material. Where raw material is solid, the material is introduced into chamber by heating, evaporating with electron beam, or sputtering with high voltage. Where raw material is liquid, the material is introduced into the chamber by evaporating with vapor pressure difference, or heating and evaporating the raw material in vessel with mantle heater and so on. Where raw material is gas, the material is directly introduced into the chamber.

After introducing the raw material into the chamber, direct current voltage or alternating current voltage (10 kHz to 100 MHz) is applied at an output of about 10 W to about 10 kW between electrodes to generate plasma, depositting an organic film on the substrate. The substrate is 500° C. or less in temperature in the time of forming a film. The substrate hadn't better be heated, if it is made of resin having low heat resistance. The chamber is preferably $1 \times 10^{-2}$ Pa to $1 \times 10^{4}$ Pa in an internal pressure in the time of forming a film.

The organic film has a average thickness of preferably 1 nm to 5 μm, more preferably 5 nm to 2 μm. The organic film is so thin that adhesion to inorganic film or gas barrier property is apt to be lowered, meanwhile, that is so thick that transparency is likely to be lowered.

Where fluorine compound is employed as one of raw material comprised in the organic film, the organic film has a volume ratio of fluorine atom $\{F\}$/metal atom $\{M\}$ being preferably 0.01 to 0.99, more preferably 0.03 to 0.9. The ratio is so small that the organic film do water absorption, and water repellency and gas barrier property are apt to be insufficient. The ratio is so large that adhesion to inorganic film is likely to be insufficient. Measure of F/M is carried out by X-ray electron spectroscopy for chemical analysis.

The value of F/M can be controlled by changing a flow ratio between metal simple substance or metallic compound and fluorine compound. The flow is a flow rate of gas which raw material in solid or liquid state is vaporized by heating or sublimation, or a flow rate of gas as raw material in gas state.

In the layered product in the invention, where alicyclic structure containing polymer is employed as one of raw material comprised in the organic film, the organic film has a volume ratio of metal atom $\{M\}$/carbon atom $\{C\}$ being preferably 0.01 to 0.99. When the value of M/C is within the range, it is easy to obtain a layered product which is good in adhesion between organic film and inorganic film. The measure of M/C is carried out by X-ray electron spectroscopy for chemical analysis.

The value of M/C can be controlled by changing a flow ratio between metal simple substance or metallic compound and alicyclic structure containing polymer. The flow means a flow rate of gas which raw material in solid or liquid state is vaporized by heating or sublimation, or a flow rate of gas as raw material in gas state.

An inorganic film comprised in the layered product in the invention is a film comprising metal simple substance or metallic compound as raw material. Metal simple substance or metallic compound is not particularly limited if it can give gas barrier property. The preferable metal simple substance or metallic compound is simple substance or compound comprising Si, Mg, Ti, Al, In, Sn, Zn, W, Ce, or Zr as element. Oxide, nitride, oxynitride, and sulfide are preferable, particularly oxide, nitride, and oxynitride are preferable as the compound.

As oxide are mentioned aluminum oxide, silicon dioxide, silicon oxynitride, ITO (indium tin oxide), IZO (indium zinc oxide), AZO (aluminum zinc oxide), zinc oxide, ICO (indium cerium oxide), titan oxide or the like, and mixture thereof. As nitride are mentioned silicon nitride or the like. Zinc sulfide or the like are mentioned as the other metallic compound. In these, silicon dioxide or silicon oxynitride is preferable. The inorganic film made from silicon dioxide or silicon oxynitride can be transparent, and high in a gas barrier property.

The inorganic film has average thickness of preferably 5 to 500 nm, more preferably 10 to 250 nm. Average thickness of the inorganic film is so thin that gas barrier property is apt to be insufficient. Average thickness of the inorganic film is so thick that flexibility of film is likely to be lowered, making a crack.

The preferable inorganic film has uniform amorphous structure which does not contain columnar structure nor particulate structure. If columnar structure or particulate structure is contained, crystal grain boundary works as diffusion channel for gas molecule, which results in being likely to lower gas barrier property.

The inorganic film is not particularly limited by the forming method. Vacuum vapor deposition process, sputtering process and CVD process are preferable, vacuum vapor deposition process or CVD process is more preferable in view of efficiently forming of inorganic film having high density. Vacuum vapor deposition process with arc discharged plasma, or CVD process is particularly preferable in view of no damage to organic film or transparent resin substrate and high density of inorganic film. Using of arc discharged plasma makes vaporized particle having a moderate energy, which can allow to form an inorganic film having high density.

Vacuum vapor deposition process is a process of forming a vapor deposition film by evaporating a raw material for deposition with resistance heating, electron beam heating, laser beam heating, arc discharging, or the like in vacuum at approximately $10^{-2}$ to $10^{-5}$ Pa.

Sputtering process is a process of forming a vapor deposition film on a resin film substrate by hitting positive ion such as $Ar^+$ which is accelerated by glow discharging and the like on a target (raw material for deposition) to sputter the raw material for deposition in vacuum at approximately 1 to $10^{-1}$ Pa in the presence of inert gas such as argon. There are DC (direct current) sputtering, RF (high frequency) sputtering, magnetron sputtering, bias sputtering and so on as the manner of sputtering.

Ion plating process is like a vapor deposition process which the vacuum vapor deposition process and the sputtering process are combined. By the process, an evaporated atom emitted by heating can be ionized and accelerated in electric field to form a thin film in high energy state, in vacuum at approximately 1 to $10^{-1}$ Pa.

CVD process is a film forming process which metallic compound alone, or combination of metal simple substance and organic compound containing oxygen atom, nitrogen atom or sulfur atom as raw material for deposition is evaporated, is optionally reacted, and the evaporated material is deposited to form a film on the substrate.

In these inorganic film forming process, sputtering process is preferable in view of improvement in uniformity of thickness in width direction, adhesion, productivity, and yield, when a wide film is produced.

A transparent resin substrate comprised in the layered product in the invention is film- or sheet-like substrate formed of transparent resin having transparency and flexibility. As the transparent resin are mentioned alicyclic structure containing polymers such as norbornene based polymers, polymers of cycloolefin having single circle, cyclic conjugated diene based polymers, vinyl alicycle hydrocarbon based polymers, and hydrogenated thereof; liner chain olefin based polymer such as polyethylene, and polypropylene; polycarbonate polymers; polyester polymers; polysulfone polymers, polyethersulfone polymers, polystyrene polymers, polyvinylalcohol polymers, cellulose acetate based polymers, polyvinylchloride polymers, polymethacrylate polymers and so on. In these, alicyclic structure containing polymers is particularly preferable in view of transparency, low water-vapor absorption, stability of dimension, weight reduction or so on.

The transparent resin comprised in the above transparent resin substrate is usually 5,000 to 100,000, preferably 8,000 to 80,000, more preferably 10,000 to 50,000 in a weight average molecular weight (Mw) in terms of polyisoprene or polystyrene as measured by gel permeation chromatography with cyclohexane (toluene or tetrahydrofuran is used if the resin cannot be dissolved in cyclohexane) as a solvent. Mw being within the range favorably results in high well-balanced property among mechanical strength and moldability of the substrate.

Also, the above transparent resin has glass transition temperature of preferably 80 to 280° C., more preferably 100 to 250° C. The transparent resin having glass transition temperature within the range can give film-like substrate having a good permanence that the substrate is hardly transformed and strained in using under high temperature.

The transparent resin substrate has average thickness of preferably 30 to 300 µm, more preferably 40 to 200 µm in view of mechanical strength.

The transparent resin substrate is preferably within 3% to average thickness in thickness deviation over width range of the substrate. The substrate having thickness deviation within the range can improve adhesion of sealing layer and smoothness of surface.

The transparent resin substrate is preferably not more than 0.1% by weight, more preferably not more than 0.05% by weight in content of volatile ingredient. Content of volatile ingredient within the above range can allow to improve dimension stability of the layered product, to lower thickness deviation of inorganic film or organic film in the layered product.

The transparent resin substrate is preferably not more than 0.01% by weight, more preferably not more than 0.007% by weight in saturated water absorption. Saturated water absorption is so large that adhesion of inorganic film or organic film and transparent resin substrate is decreased, and peeling off between the layers may easily occur during use in a long time.

Besides, effused water-vapor from the substrate is apt to require long time for vacuum exhaust, to turn inorganic film or organic film bad, and to decline productivity or yield. Saturated water absorption of substrate can be determined by weight growing of post permeation against pre permeation as measured by permeating the substrate fully dried with an oven into distilled water and weighing it after wiping water based on JIS K 7209.

The transparent resin substrate may optionally comprise the known additives such as antioxidant, thermal stabilizer, optical stabilizer, ultra violet absorber, antistatic agent, dispersant, chlorine catcher, flame retardant, crystallization core agent, anti-blocking agent, anti-clouding agent, parting agent, pigment, organic filler, inorganic filler, neutralization agent, lubricant, decomposition agent, metal deactivator, stain-proofing agent, antibacterial agent, the other resins, and thermoplastic elastomer unless effect in the invention is killed. The additives are compounded usually 0 to 5 parts by weight, preferably 0 to 3 parts by weight based on 100 parts of transparent resin.

The transparent resin substrate, which is not limited by a process thereof, can be obtained by solution casting process, extrusion process or the like. In these, extrusion process is preferable in view of lowering thickness deviation and content of volatile ingredient in the transparent resin substrate. There are a method with dies and an inflation method as extrusion process. A method with dies, particularly T-die, is more preferable in view of thickness precision or good productivity.

The transparent resin substrate used in the invention is preferably not less than 85%, more preferably not less than 90% in transmission over visible light ray under thickness of 3 mm for transparency. The transparency is so little that it is fear that the substrate is hardly used for optical use.

As the transparent resin substrate may be used a substrate which surface of one side or both sides is reformed. The surface reforming treatment can improve adhesion of organic film and inorganic film. There are mentioned energy ray irradiation treatment, and chemical treatment as the surface reforming treatment.

As energy ray irradiation treatment are mentioned corona discharge treatment, plasma treatment, electron beam irradiation treatment, ultra violet ray irradiation treatment, or so on. Corona discharge treatment or plasma treatment is preferable, corona discharge treatment is particularly preferable in view of efficiency of treatment.

As chemical treatment is mentioned a method by permeation in aqueous solution of oxidation agent such as potassium dichromate and concentrated sulfuric acid, and sufficiently water washing after the permeation. Though shaking in the above permeation results in efficient chemical treatment, too long time chemical treatment may cause to dissolve the surface of the substrate, or to lower transparency, so treatment time and the like had better be controlled according as reactivity or concentration of chemical.

Figure 2:
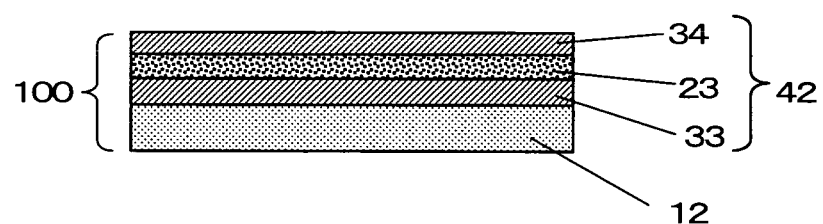
FIG. 2: cross section of an example of a layered product in the invention.

A layered product in the invention has a structure which one organic film and one inorganic film are layered or not less than two of organic films and not less than two of inorganic films are alternately layered on one side or both sides of the above transparent resin substrate. The number of layers of organic film and the number of layers of inorganic film may be the same, or one layers may be more than other layers by one. FIG. 2 shows cross section of an example of layered product 100 in the invention. A sealing film 42 comprising inorganic film 33, organic film 23, and inorganic film 34 is layered on a transparent resin substrate 12.

The film exposed to the transparent resin substrate may be inorganic film or organic film. When organic film is exposed to the transparent resin substrate, even though the resin film substrate has uneven surface, organic film smoothes the uneven surface of the substrate, which results inorganic film formed on the above organic film to be thick and even film having no defect, elevating gas barrier property. Also, even if the transparent resin substrate receives stress from outside, organic film relieves strain, which results in that crack is hardly made in inorganic film, and high level in gas barrier property is favorably kept for long time.

The layered product in the invention has water vapor transmission rate of preferably 0.1 $g/m^2/24$ hr or less, more preferably 0.09 $g/m^2/24$ hr or less. The rate within the range can sufficiently seal luminescence device or the like, and can restrain degradation of luminescent-material in the luminescence device. Water vapor transmission rate may be measured with commercial measure for water vapor transmission rate based on B method in JIS K 7129.

Figure 3:
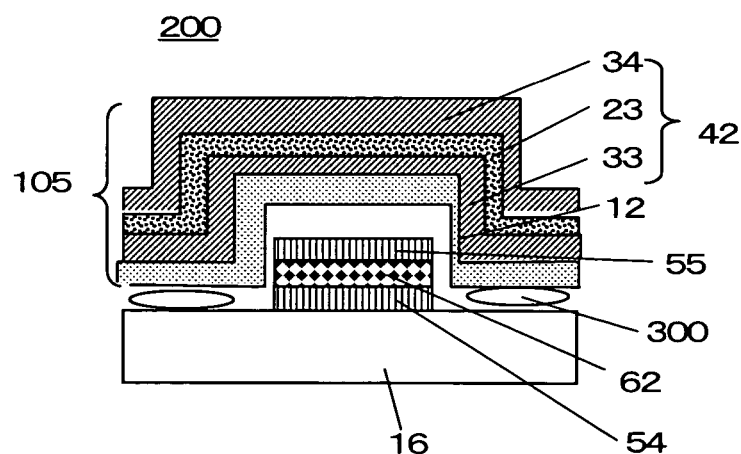
FIG. 3: cross section of an example of luminescence device in the invention.

A luminescence device in the invention is explained as the following. FIG. 3 shows cross section of an example of the first mode of the luminescence device in the invention. The luminescence device 200 of first mode in the invention comprises a laminate of substrate 16, lower electrode layer 54, luminescent-material layer 62, upper electrode layer 55 and sealing layer 105 in turn, in which the sealing layer is the layered product in the invention.

The substrate 16 used in the luminescence device in the invention is preferably 50% or more in a transmission over visible light range of 400 to 700 nm, is preferably flat and is preferably hard to change the quality when electrode or the each layers of the device are formed. As the substrate are mentioned glass plate, polymer film and so on. The substrate has average thickness of usually 30 μm to 3 mm, preferably 50 to 300 μm.

As material comprised in upper electrode layer 55 used in a luminescence device in the invention is mentioned material for emitting light through upper electrode layer. Specifically, electrical conductive metal oxide, translucent metal, or laminated product thereof are mentioned. More specifically, indium oxide, zinc oxide, tin oxide, and transparent conductive material (NESA etc.) comprising complex thereof being indium tin oxide (ITO), indium zinc oxide and the like; gold, platinum, silver, copper are used. In these, ITO, indium zinc oxide, and tin oxide are preferable.

Average thickness of the upper electrode layer may be properly selected, usually 10 nm to 10 μm, preferably 100 to 500 nm in view of light transparency and electric conductivity.

In the luminescence device in the invention, transparency or semi-transparency of upper electrode layer is favorable for efficiency of light production. As manner of making upper electrode layer are mentioned vacuum vapor deposition process, sputtering process, and lamination process which metal foil is heat-pressed.

Material comprised in luminescent-material layer 62 used in the luminescence device in the invention is not particularly limited, luminescent-material known in conventional organic EL device may be employed. As the luminescent-material are specifically mentioned fluorescent whitening agent such as benzothiazole based fluorescent whitening agent, benzimidazole based fluorescent whitening agent, and benzoxazole based fluorescent whitening agent; metal chelated oxinoide compound, styrylbenzene compound, distyrylpyrazine derivative, aromatic dimethylizine compound and so on.

Average thickness of luminescent-material layer is different in suitable thickness depending on used material, may be selected so as to be proper value in drive voltage and emission efficiency, and is usually 1 nm to 1 μm, preferably 2 nm to 500 nm.

In luminescence device in the invention, mixture of not less than two luminescent-materials may be employed in luminescent-material layer, not less than two luminescent-material layers may be layered. As the manner for making the luminescent-material layer are mentioned vacuum vapor deposition process, casting process or so on.

Material comprised in lower electrode layer 54 used in the luminescence device in the invention being low in work function is preferable. Specular body as the material for lower electrode layer is preferable for reflecting light which is emitted from luminescent-material layer to lower electrode layer and sending light to sealing layer side. As specific material can be used metal such as lithium, sodium, potassium, rubidium, cesium, beryllium, magnesium, calcium, strontium, barium, aluminum, scandium, vanadium, zinc, yttrium, indium, cerium, samarium, europium, terbium, and ytterbium; alloy of at least two metals selected from the above metals; alloy of at least one metal selected from the above metals and at least one metal selected from the group consisting of gold, silver, platinum, copper, manganese, titanium, cobalt, nickel, tungsten, and tin; graphite, inter graphitic compound or the like. As alloy may be exampled magnesium-silver alloy, magnesium-indium alloy, magnesium-aluminum alloy, indium-silver alloy, lithium-aluminum alloy, lithium-magnesium alloy, lithium-indium alloy, calcium-aluminum alloy or so on. The lower electrode layer may comprise layered structure having at least two layers. As the manner of making lower electrode layer are mentioned vacuum vapor deposition process, sputtering process, ion plating process, plating process or so on.

Average thickness of lower electrode layer may be properly selected in light of electric conductivity or permanence, is usually 10 nm to 10 μm, preferably 100 to 500 nm.

The luminescence device in the invention may be comprises layers other than transparent substrate 16, lower electrode layer 54, luminescent-material layer 62, upper electrode layer 55 and sealing layer 105.

As other layers are mentioned hole injection layer, hole transport layer, electron transport layer, and electron injection layer.

The hole injection layer is a layer which is installed so as to border on positive electrode and works for improving efficiency of hole injection from the positive electrode. The hole injection layer has average thickness of usually 1 nm to 100 nm, preferably 2 nm to 50 nm.

The hole transport layer works for transporting positive hole. Thickness of the hole transport layer is different in suitable thickness depending on used material, may be selected so as to be proper value in drive voltage and emission efficiency, is at least required not so as to make pin hole, and is unfavorably so thick that drive voltage for device is elevated. Therefore the positive hole transport layer has average thickness of usually 1 nm to 1 μm, preferably 2 nm to 500 nm.

As material used for positive hole injection layer and positive hole transport layer is mentioned material known as positive hole transfer compound in conventional organic EL device.

The electron transport layer works for transporting electron. Thickness of the electron transport layer is different in suitable thickness depending on used material, may be selected so as to be proper value in drive voltage and emission efficiency, is at least required not so as to make pin hole, and is unfavorably so thick that drive voltage for device is elevated. Therefore the electron transport layer has average thickness of usually 1 nm to 1 μm, preferably 2 nm to 500 nm.

The electron injection layer is a layer which is installed so as to border on negative electrode and works for improving efficiency of electron injection from the negative electrode and takes effect of decreasing drive voltage for the device.

The electron injection layer has average thickness of usually 1 nm to 100 nm, preferably 2 nm to 50 nm.

As material used for electron transport layer and electron injection layer is mentioned material known as electron transfer compound in conventional organic EL device.

As manner of making the other layers are mentioned known processes such as spin coat process, casting process, vacuum vapor deposition process and so on.

The sealing layer 105 in the first mode is the above layered product in the invention. That is to say, the sealing layer 105 comprises a transparent resin substrate 12 and a sealing film 42 comprising inorganic film 33, organic film 23 and inorganic film 34. The layered product in the invention covers and adheres to the luminescence device, which can result in preventing the luminescent-material layer from deteriorating by water-vapor, oxygen and so on.

In the luminescence device, the sealing layer is preferably installed so as to cover side surface of lower electrode layer, luminescent-material layer and upper electrode layer, more preferably installed so as to cover the transparent substrate too. The sealing layer installed as the above can shield water-vapor or gas from the side surface. In FIG. 3, transparent substrate 16 and sealing layer 105 are sealed with adhesive material 300.

Figure 4:
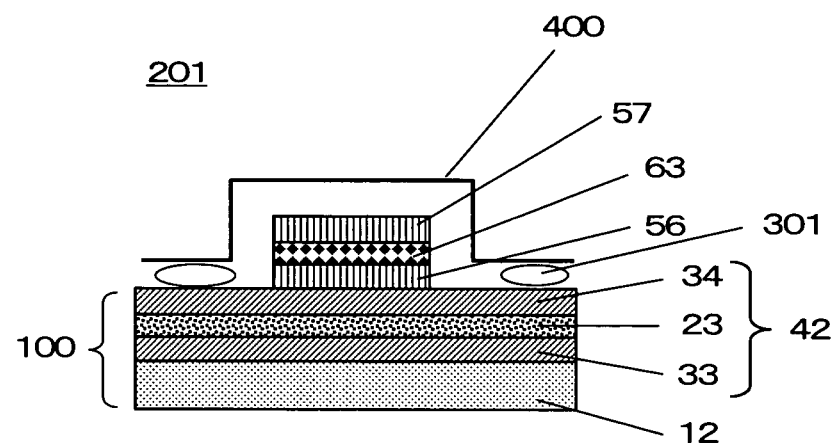
FIG. 4: cross section of an example of luminescence device in the invention.

FIG. 4 shows cross section of an example of the second mode of the luminescence device in the invention. The luminescence device 201 of the second mode in the invention comprises a lamination of substrate 100, lower electrode layer 56, luminescent-material layer 63, upper electrode layer 57 and sealing layer 400 in turn, in which the substrate 100 comprises the layered product in the invention.

Lower electrode layer 56, luminescent-material layer 63, and upper electrode layer 57 are the same as those in the first mode. The sealing layer 400 is a layer usually used in conventional organic EL device.

The substrate 100 in the second mode comprises the above layered product in the invention. Lamination of electrode layer, luminescent-material layer and the like on the layered product in the invention can prevent water-vapor or oxygen from permeating through the substrate, and prevent electrode layer and luminescent-material layer from deteriorating.

Figure 5:
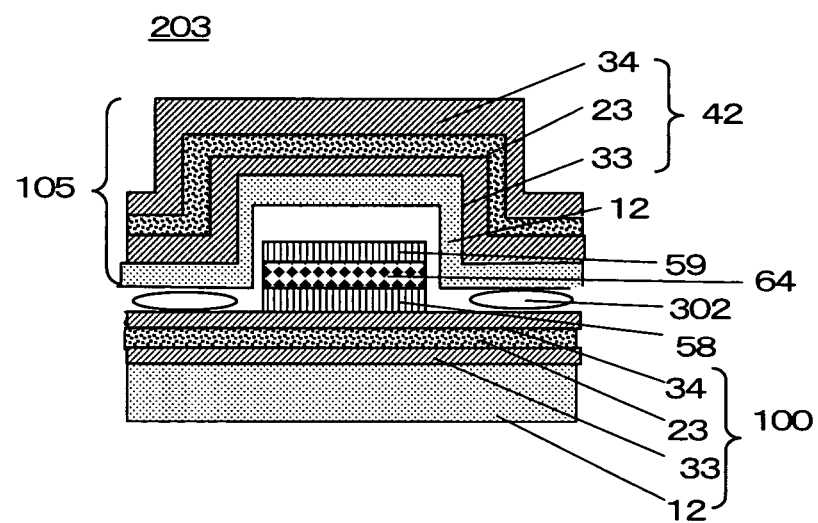
FIG. 5: cross section of an example of luminescence device in the invention.

FIG. 5 shows cross section of an example of the third mode of the luminescence device in the invention. The luminescence device of the third mode in the invention corresponds to combination of the first mode and the second mode. Specifically, the third mode comprises a laminate of substrate 100, lower electrode layer 58, luminescent-material layer 64, upper electrode layer 59, and sealing layer 105 in turn, in which the substrate 100 and the sealing layer 105 respectively comprise the above layered product in the invention.

Figure 6:
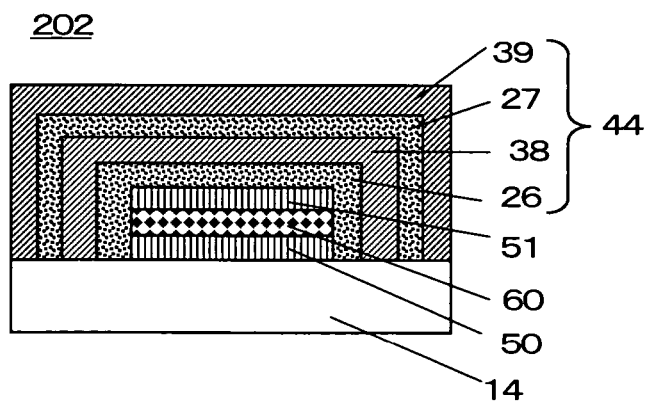
FIG. 6: cross section of an example of luminescence device in the invention.

FIG. 6 shows cross section of an example of the fourth mode of the luminescence device in the invention. The luminescence device of the fourth mode in the invention comprises transparent substrate 14, lower electrode layer 50, luminescent-material layer 60, upper electrode layer 51, and sealing layer 44, in which on the transparent substrate 14 are laminated in turn the lower electrode layer 50, the luminescent-material layer 60 and the upper electrode layer 51, and the lower electrode layer 50, the luminescent-material layer 60 and the upper electrode layer 51 are sealed with the sealing layer 44. The sealing layer 44 comprises a laminate of at least one inorganic film 38, 39 and at least one organic film 26, 27; in which the organic film is made from metallic simple substance or metallic compound and alicyclic structure containing polymer as raw material.

The sealing layer 44 in the fourth mode is the same component as the sealing film 42 comprised in the layered product 100 in the invention as shown in FIG. 2. The manner of making sealing layer and preferable mode are the same as those explained in the above layered product in the invention except that a laminate of transparent substrate 14, lower electrode layer 50, luminescent-material layer 60 and upper electrode layer 51 takes the place of the transparent resin substrate 12.

Figure 7:
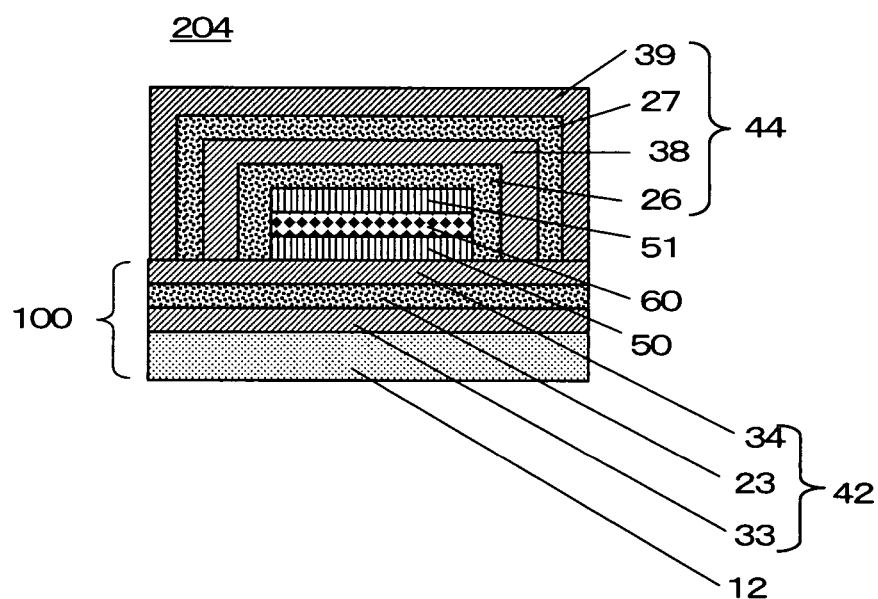
FIG. 7: cross section of an example of luminescence device in the invention.

FIG. 7 shows cross section of an example of the fifth mode of the luminescence device in the invention. The luminescence device of the fifth mode in the invention corresponds to combination of the second mode and the third mode. Specifically, the fifth mode comprises a lamination of substrate 100, lower electrode layer 50, luminescent-material layer 60, upper electrode layer 51, and sealing layer 44 in turn, in which the substrate is the layered product in the invention, the sealing layer comprises a laminate of at least one inorganic film 38, 39 and at least one organic film 26, 27; in which the organic film is at least made from metallic simple substance or metallic compound and alicyclic structure containing polymer as raw material.

The sealing layer 44 in the fifth mode is the same component as the sealing film 42 comprised in the layered product 100 in the invention. The manner of making sealing layer and preferable mode are the same as those explained in the above layered product in the invention except that a laminate of transparent substrate 14, lower electrode layer 50, luminescent-material layer 60 and upper electrode layer 51 takes the place of the transparent resin substrate 12.

Figure 8:
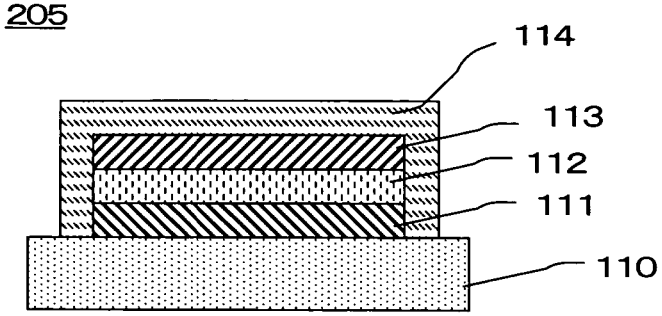
FIG. 8: cross section of an example of luminescence device in the invention.

FIG. 8 shows cross section of an example of the sixth mode of the luminescence device in the invention. The luminescence device of the sixth mode in the invention comprises substrate 110, lower electrode layer 111, luminescent-material layer 112, upper electrode layer 113, and sealing layer 114, in which on the substrate 110 are laminated in turn the lower electrode layer 111, the luminescent-material layer 112 and the upper electrode layer 113; and the lower electrode layer 111, the luminescent-material layer 112 and the upper electrode layer 113 are sealed with the sealing layer 114. The sealing layer 114 comprises polymer of fluorine compound and metallic compound, in which relationship among refractive index $n_E$ of the upper electrode layer 113, refractive index n of the sealing layer 114 and refractive index $n_A$ of outside atmosphere of the sealing layer 114 is $n_E > n > n_A$.

In the luminescence device of the sixth mode in the invention, the sealing layer 114 comprises a film made from fluorine compound and metallic compound as raw material (the sealing layer 114 comprises polymer of fluorine compound and metallic compound in FIG. 8). And relationship among refractive index $n_E$ of the upper electrode layer, refractive index n of the sealing layer and refractive index $n_A$ of outside atmosphere of the sealing layer is $n_E > n > n_A$. The relationship can decrease reflection loss of emitted light from upper electrode layer to outside. The luminescence device of the sixth mode in the invention is preferably 0.5 or less in difference between n and $n_E$, and difference between n and $n_A$ respectively.

Figure 9:
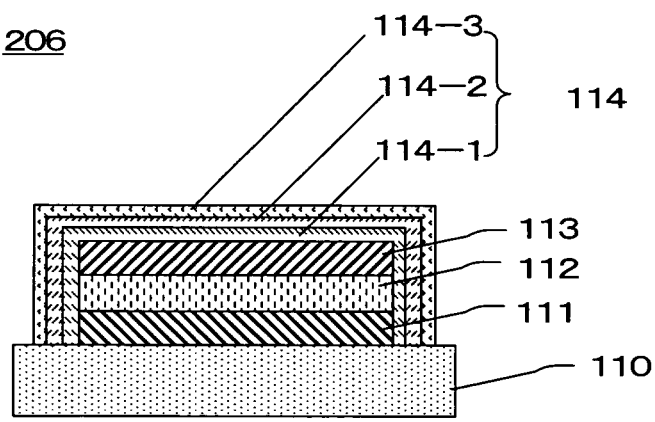
FIG. 9: cross section of an example of luminescence device in the invention.

FIG. 9 shows cross section of an example of the seventh mode of the luminescence device in the invention.

The luminescence device in FIG. 9 comprises substrate 110, lower electrode layer 111, luminescent-material layer 112, upper electrode layer 113 and sealing layer 114, in which on the substrate 110 are laminated in turn the lower electrode layer 111, the luminescent-material layer 112 and the upper electrode layer 113, and the lower electrode layer 111, the luminescent-material layer 112 and the upper electrode layer 113 are sealed with the sealing layer 114. The sealing layer 114 comprises a layered film (114-1, 114-2, 114-3) of polymer of fluorine compound and metallic compound, having relationship among refractive index $n_E$ of the upper electrode layer 113, refractive indexes $n_1$, $n_2$, $n_3$ of each film layers 114-1, 114-2, 114-3 comprised in the sealing layer and refractive index $n_A$ of outside atmosphere of the sealing layer 114 is $n_E > n_1 > n_2 > n_3 > n_A$.

In the luminescence device of the seventh mode in the invention, the sealing layer 114 comprises a layered film made from fluorine compound and metallic compound as raw material (the sealing layer 114 is a layered film comprising polymer of fluorine compound and metallic compound in FIG. 9). And the sealing layer has relationship of $n_E > n_1 > n_2 > \ldots > n_X > n_A$, where each refractive index of layers in the layered film is represented as $n_1, n_2, \ldots,$ and $n_X$ in order of nearness from the upper electrode layer, in which x is number of the layers. The relationship can decrease reflection loss of emitted light from upper electrode layer to outside. The luminescence device of the seventh mode in the invention is preferably 0.3 or less in difference of refractive indexes $n_E$, $n_1, n_2, \ldots, n_X, n_A$ between neighboring layers respectively.

In the luminescence device of the sixth and seventh modes, the sealing layer is preferably installed so as to cover side surface of lower electrode layer, luminescent-material layer and upper electrode layer, more preferably installed so as to cover the transparent substrate too. The sealing layer installed as the above can shield water-vapor or gas from the side surface.

The sealing layer 114 in the sixth and seventh modes are the same component as the sealing film 23 comprised in the layered product 100 in the invention as shown in FIG. 2. The manner of making the sealing layer and preferable mode thereof are the same as the manner of making the organic film explained in the above layered product in the invention except that a laminate of transparent substrate 110, lower electrode layer 111, luminescent-material layer 112 and upper electrode layer 113 takes the place of the transparent resin substrate 12.

The sealing layer comprising organic film in the sixth and seventh modes can be made by putting a laminate (circuit of luminescence device) of transparent substrate 110, lower electrode layer 111, luminescent-material layer 112 and upper electrode layer 113 in vacuum, and mixing fluorine compound and metallic compound in vacuum to deposit a film on the laminate. Refractive index of the sealing layer can be controlled by mixing ratio between metallic compound and fluorine compound. In the seventh mode, each film layer comprised in the sealing layer can be deposited at mixing ratio $m_1, m_2, \ldots, m_x$ ($m_1 > m_2 > \ldots > m_X$) of metallic compound and fluorine compound to make a laminated film having relationship of $n_E > n_1 > n_2 > \ldots > n_X > n_A$.

Fluorine compound and metallic compound used for obtaining the luminescence device of the sixth and seventh mode in the invention are the same as those explained in the above organic film for the layered product in the invention. As the manner of depositing a film with fluorine compound and metallic compound are preferably mentioned sputtering process, ion plating process, and CVD process, is more preferably mentioned CVD process assisted with plasma, electron beam, ion beam or laser. In the CVD process for depositing of sealing layer, mixing ratio of fluorine compound and metallic compound can be easily changed to control refractive indexes of the sealing layer.

In the CVD process, plasma CVD process is easiest and preferable process. The manner of plasma CVD process is conventionally known. For instance, the manner described in JP-A-H09-237783 may be adopted. Micro wave CVD device, ECR-CVD device, and high density plasma CVD device (Helicon wave excited plasma, inductive coupling plasma) or so on may be used, though parallel plate type CVD device is a prevailing device for plasma CVD process. First, circuit of luminescence device is set in chamber of CVD device. And air in the chamber of CVD device is exhausted to depressurize the chamber to 0.1 Pa or less, then fluorine compound and metallic compound as raw material are introduced into the chamber. Where raw material is solid, the material is introduced into chamber by heating, evaporating with electron beam, or sputtering with high voltage. Where raw material is liquid, the material is introduced into the chamber by evaporating with vapor pressure difference, or heating and evaporating the raw material in vessel with mantle heater and so on. Where raw material is gas, the material is directly introduced into the chamber.

After introducing the raw material into the chamber, direct current voltage or alternating current voltage (10 kHz to 100 MHz) is applied between electrodes at an output of 10 W to 10 kW to generate plasma, forming a sealing layer on the set device. The substrate is 500° C. or less in temperature in the time of forming a film. The transparent substrate hadn't better be heated, if it is made from resin having low heat resistance. The chamber is preferably $1 \times 10^{-2}$ Pa to $1 \times 10^4$ Pa in an internal pressure in the time of forming a film.

Mixing ratio between fluorine compound and metallic compound can be controlled by change flow ratio between them. The flow means a flow rate of gas which raw material in solid or liquid state is vaporized by heating or sublimation, or a flow rate of gas as raw material in gas state.

The luminescence device in the invention is preferably 0.1 g/m²/24 hr or less, more preferably 0.09 g/m²/24 hr or less in water vapor transmission rate of the sealing film or the sealing layer. The rate within the range can sufficiently seal luminescence device or the like, and can restrain degradation of luminescent-material in the luminescence device. Water vapor transmission rate may be measured with commercial measure for water vapor transmission rate based on the B method of JIS K 7129. If the sealing layer is the layered product, it means water vapor transmission rate of the layered product as a whole. In the luminescence device in the invention, the sealing layer has average thickness of preferably 10 nm to 1 μm, more preferably 100 nm to 500 nm.

The luminescence device in the invention is preferably 80% or more, particularly preferably 90% or more in light transmission at the range of 400 to 800 nm in a wave length during no light emission. High light transmission during no light emission results in taking effect that forward visibility is not hindered, when the luminescence device in the invention is installed on windshield of automobile and so on.

The luminescence device in the invention can be employed for a back light unit or a plane light-source of a segment display, dot matrix display, and liquid crystal display.

Plane positive electrode (upper electrode layer) and negative electrode (lower electrode layer) may be allocated to make plane light-source having the luminescence device in the invention. For patterned light emission, there are manner of setting mask having patterned windows over the plane luminescence device, manner of thickening organic matter layer extremely on the set no-emission domain not to radiate light substantially, and manner of patterning on both or any one of positive electrode and negative electrode. The segment type display, which can display figures, letters, marks and so on, can be obtained by patterning with any one of the above manner, and disposing some electrodes which can be independently switched ON or OFF. A striped positive electrode and a striped negative electrode may be piled in right angle to obtain dot matrix display. Partial color display or multi color display can be given by districting plural polymer paints having different emission color, and by using color filter or fluorescent transformation filter. The dot matrix display may have passive drive system or active drive system in which thin film transistor with amorphous silicon or low temperature poly-silicon is incorporated. The displays may be employed for computer, television, mobile terminal, mobile phone, car navigation system, viewfinder on video camera and so on.

The above plane luminescence device is flat and self emissive, may be preferably employed in plane light source for back light of liquid crystal display, or plane light source for illumination. If the flexible substrate is used, the luminescence device can be used as curved surface light source or curved surface display.

EXAMPLE

The following examples and comparative examples are shown to explain the invention in the concrete. The invention is not limited by these examples. In the examples, "part(s)" and "%" are part(s) by weight and % by weight respectively, unless otherwise specified.

Measurements in the examples are described as the following method:
(1) Thickness of Organic Film and Inorganic Film
Thickness of organic film and inorganic film was measured with thin film measurement (F20, produced by FILMETRIX Co.)
(2) Water Absorption of Organic Film
Water absorption (%) of organic film was determined by weight growing of the permeated organic film in water having 60° C. for 24 hours against the dried organic film in an oven having 60° C. for 30 minutes.
(3) Proportion (M/C, F/M) of Composition of Organic Film
Volume proportion (M/C, F/M) of organic film was determined with X-ray electron spectroscopy for chemical analysis.
(4) Water Vapor Transmission Rate (WVTR)
WVTR was measured at 40° C. and 90% RH with water vapor transmission rate measure ("Permatran" produced by MOCON, based on JIS K 7129 B method (infrared ray censor method).

First, sealing film was laminated on PET film having thickness of 100 μm as transparent resin substrate to obtain layered product, water vapor transmission rate $P_0$ of the layered product was determined. Then water vapor transmission rate $P_f$ of the sealing film was calculated by the Formula (2). Water vapor transmission rate $P_s$ of the transparent resin substrate was separately determined.

$$P_0/d_0 = (d_f/P_f + d_s/P_s)^{-1} \qquad \text{Formula (2)}$$

In the Formula (2), $P_0$, $P_f$, and $P_s$ represent water vapor transmission rate of the layered product, the sealing layer, and the substrate respectively; $d_0$, $d_f$, and $d_s$ represent thickness of the layered product, the sealing layer, and the substrate respectively. Less water vapor transmission rate is better in water vapor barrier property.
(5) Adhesion
Adhesion between layers of layered product was evaluated by cross-cut sticky tape peeling test.

Cut reaching from the surface of layered product to the resin substrate was carried out to make 100 pieces having a size of 1 mm square, sticky tape was attached on the surface of the pieces, then the sticky tape was torn at 180° in angle. The number of piece which didn't stick on the torn sticky tape was counted to give a fraction per 100 pieces. More fraction shows larger adhesion between layers. The piece adhered to the torn sticky tape proves that peeling off occurs in any interface between layers of the layered product.

(6) Refractive Index

Refractive index was measured with ellipsometer (produced by JASCO Corporation) at 633 nm in wave length of light.

Example 1

FIG. 2 is cross section of layered product in Example 1 to 2.

In Example 1, as transparent resin substrate 12 was used film (ZEONOR FILM ZF-14, thickness=100 μm, produced by Zeon Corp.) made from norbornene based polymer being one of alicyclic structure containing polymers. $SiO_2$ as target material was deposited on the substrate by RF sputtering process to make an inorganic film 33 having average thickness of 200 nm. Then norbornene based polymer (ZEONOR 1600 produced by Zeon Corp., "COP" in table) being one of alicyclic structure containing polymers was provided at film making rate of 90 nm/min, and $SiO_2$ was simultaneously provided at film making rate of 10 nm/min, by electron beam vapor deposition process to make an organic film 23 having thickness of 1 μm on the above inorganic film. And $SiO_2$ as target material was deposited on the above organic film by RF sputtering process to make an inorganic film 34 having average thickness of 200 nm, which results obtaining a layered product 100-1 comprising a sealing film 42.

The obtained layered product and organic film were tested and evaluated by the above methods. The results are shown in TABLE 1.

Example 2

Figure 10:
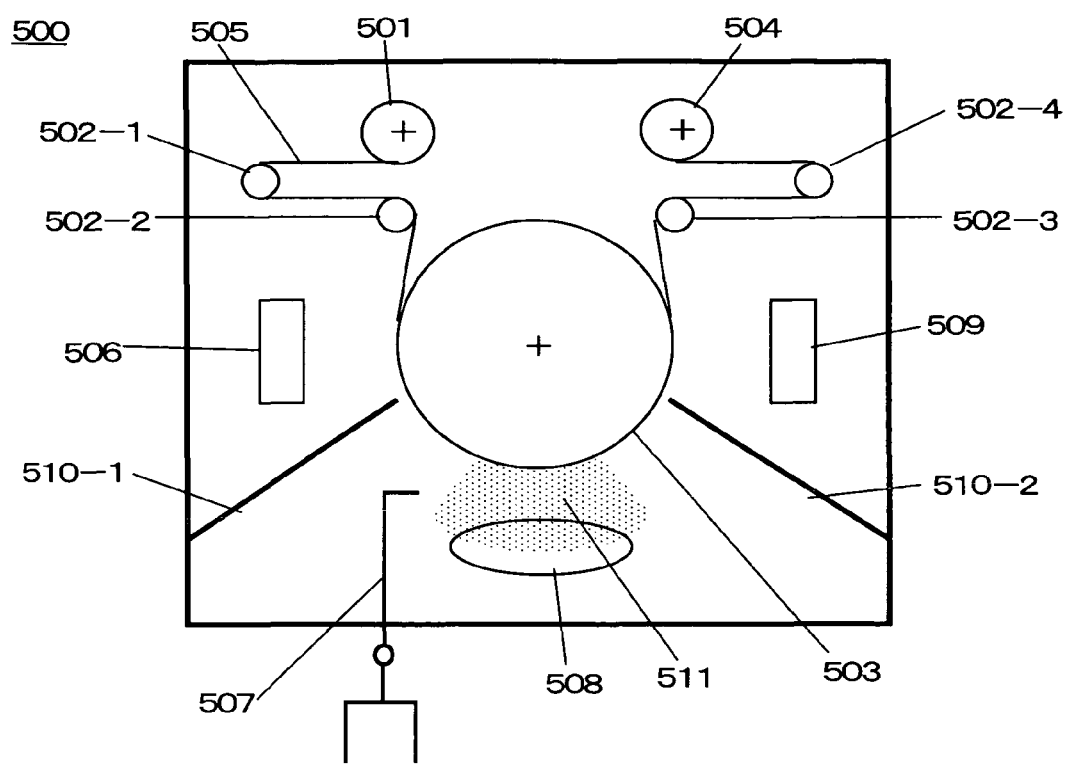
FIG. 10: cross section of an example of a system for making a layered product in the invention.

In EXAMPLE 2, as transparent resin substrate 12 was used film (ZEONOR FILM ZF-14, thickness=100 μm, produced by Zeon Corp.) made from norbornene based polymer being one of alicyclic structure containing polymers. The substrate was winded on a winding-off roll 501 in continuous vacuum sputtering system (direct current magnetron sputtering system) as shown in FIG. 10. Silicon dioxide was filled in target 506 and 509.

Then, vacuum exhausting from vacuum chamber 500 was begun to reach to $1\times10^{-5}$ Pa in pressure. The transparent resin substrate was winded off from winding-off roll 501 at 0.1 m/min in velocity, silicon dioxide film having thickness of 200 nm was formed by sputtering from target 506 on condition that the traveled film on the deposition roll 503 was loaded with tension of 30 N. Tetrafluoromethane ($CF_4$) and tetraethoxysilane (TEOS) were flowed from inlet line 7, at respectively 0.101 Pa·m$^3$/sec and 0.0676 Pa·m$^3$/sec (flow ratio by volume 60:40) under plasma by applying high frequency at ring 508 to be reacted, organic film having thickness of 1 μm was formed on the silicon dioxide film of the transparent substrate 505 traveled on the deposition roll 503. A silicon dioxide film having thickness of 200 nm by sputtering from target 509 was formed on the organic film, winded back to wind roll 504 to layer the inorganic film, the organic film, and the inorganic film in turn on the transparent resin substrate, which allowed to obtain layered product 100-2 having sealing layer 42 as shown in FIG. 2. Vacuum chamber 500 during deposition was 0.3 Pa in pressure.

The obtained layered product and organic film were tested and evaluated by the same methods as EXAMPLE 1. The results are shown in TABLE 1.

Comparative Example 1

In the deposition of organic film, layered product was obtained by the same manner as EXAMPLE 1 except that alicyclic structure containing polymer (ZEONOR 1600 produced by Zeon corp.) was provided at deposition rate of 100 nm/min, and $SiO_2$ was simultaneously provided at deposition rate of 0 nm/min. The obtained layered product and organic film were tested and evaluated by the same methods as EXAMPLE 1. The results are shown in TABLE 1.

TABLE 1

| | Deposition Rate (nm/min) COP:$SiO_2$ | Flow Ratio by Volume | Organic Film composition ratio M/C | Organic Film composition ratio F/M | Water Absorption (%) | Inorganic Film WVTR (g/m$^2$/day) | Inorganic Film adhesion |
|---|---|---|---|---|---|---|---|
| Ex. 1 | 90:10 | — | 0.08 | — | 0.08 | 0.08 | 100/100 |
| Ex. 2 | — | 60:40 | — | 0.5 | 0.08 | 0.1 | 100/100 |
| Comp. Ex. 1 | 100:0 | — | — | — | 0.1 | 0.3 | 15/100 |
| Comp. Ex. 2 | — | 100:0 | — | — | 0.1 | 0.3 | 15/100 |

Comparative Example 2

In the deposition of the organic film, layered product was obtained by the same manner as EXAMPLE 2 except that gas flow of tetrafluoromethane ($CF_4$) was changed to 0.169 Pa·m$^3$/sec, tetraethoxysilane (TEOS) wasn't sent (flow ratio by volume 100:0). The obtained layered product and organic film were tested and evaluated by the same methods as EXAMPLE 1.

(7) Luminance L

Five Volts in driving voltage was applied to organic EL device, light radiated from sealing layer was measured with luminance measure (produced by OHTSUKA ELECTRONICS CO. LTD., MCPD-7000) to obtain emission luminance in right angle direction.

(8) Emission Life T

Organic EL device was continuously worked with constant-current in the condition of an initial emission luminance of 100 cd/m$^2$ at 20° C. and 40% R.H., and time that it took to lower to half emission luminance was measured. Longer time is better emission life.

(9) Scratch Resistance

The surface of sealing layer was scraped three times with steal wool #0000 at 0.05 MPa in load, the number of scratch lines on the surface was counted. Less scratch line is better scratch resistance.

Example 3

FIG. 3 is cross section of luminescence device in Examples 3 to 4.

In a resistance heater with reduced pressure of $10^{-4}$ Pa or less, Al as lower electrode layer 54 having thickness of 100 nm, lithium fluoride as electron injection layer (no illustration in the figures) having thickness of 1 nm, hydroxyquinoline aluminum (thereafter, Alq3) as luminescent-material layer 62 having thickness of 60 nm, and allylamine derivative (α-NPD) as positive transport layer (no illustration in the figures) having thickness of 40 nm were deposited in turn on a glass substrate 16. This deposition rate was 0.5 nm/min. In a DC sputtering device with reduced pressure of $10^{-4}$ Pa or less, ITO as upper electrode layer 55 having thickness of 200 nm was deposited. This deposition rate was 30 nm/min.

Then, the layered product 100-1 obtained in EXAMPLE 1, in state that the transparent resin substrate was faced, was pasted with an epoxy cement 300, so as to cover from the lower electrode layer 54 to the upper electrode layer 55, on the glass substrate 16 to obtain a luminescence device 200-1 with sealing layer 105. Evaluation results of the obtained luminescence device 200-1 are shown in TAB. 2.

Example 4

Luminescence device 200-2 was obtained by the same manner as EXAMPLE 3 except that the layered product 100-2 obtained in EXAMPLE 2 was used as layered product for sealing layer in stead of the layered product 100-1 obtained in EXAMPLE 1. Evaluation results of the obtained luminescence device 200-2 are shown in TAB. 2.

Example 5

FIG. 4 is cross section of luminescence device in Example 5 in the invention.

On the layered product 100-1 obtained in EXAMPLE 1, Al as lower electrode layer 56 having thickness of 100 nm, lithium fluoride as electron injection layer (no illustration in the figures) having thickness of 1 nm, Alq3 as luminescent-material layer 63 having thickness of 60 nm, allylamine derivative (α-NPD) as positive transport layer (no illustration in the figures) having thickness of 40 nm and ITO as upper electrode layer 57 having thickness of 200 nm were deposited in turn by the same manner as EXAMPLE 3.

Then, layered product 100 and glass cap 400 were pasted with an epoxy cement 301 so as to cover from the lower electrode layer 56 to the upper electrode layer 57 on the layered product 100-1 to obtain a luminescence device 201. Evaluation results of the obtained luminescence device 201 are shown in TAB. 2.

Example 6

FIG. 6 is cross section of luminescence device in Examples 6 in the invention.

On the glass substrate 14, Al as lower electrode layer 50 having thickness of 100 nm, lithium fluoride as electron injection layer (no illustration in the figures) having thickness of 1 nm, Alq3 as luminescent-material layer 60 having thickness of 60 nm, allylamine derivative (α-NPD) as positive transport layer (no illustration in the figures) having thickness of 40 nm and ITO as upper electrode layer 51 having thickness of 200 nm were deposited in turn by the same manner as EXAMPLE 3.

Then, in an electron beam vapor deposition device with reduced pressure of $10^{-2}$ Pa or less, norbornene based polymer (ZEONOR 1600, produced by ZEON Corp.) being one of alycyclic structure containing polymers at 90 nm/min in deposition rate, $SiO_2$ at 10 nm/min in deposition rate were simultaneously evaporated to deposit an organic film 26 having thickness of 300 nm so as to cover from the lower electrode layer 50 to the upper electrode layer 51 on the glass substrate 14. Next, in a DC sputtering device with reduced pressure of $10^{-2}$ Pa or less, an inorganic film 38 of $SiO_2$ having thickness of 200 nm was deposited. Further more, organic film 27, inorganic film 39 were layered in turn by the same manner as the above to obtain a luminescence device 202 with a sealing layer 44. Evaluation results of the obtained luminescence device 202 are shown in TAB. 2.

Example 7

FIG. 5 is cross section of luminescence device in Examples 7 in the invention. On the layered product 100-1 obtained in EXAMPLE 1 as a substrate, Al as lower electrode layer 58 having thickness of 100 nm, lithium fluoride as electron injection layer (no illustration in the figures) having thickness of 1 nm, Alq3 as luminescent-material layer 64 having thickness of 60 nm, allylamine derivative (α-NPD) as positive transport layer (no illustration in the figures) having thickness of 40 nm and ITO as upper electrode layer 59 having thickness of 200 nm were deposited in turn by the same manner as EXAMPLE 3.

Then, another layered product 100-1 obtained in EXAMPLE 1 as sealing layer 105 was pasted with an epoxy cement 302, in the state that the side of transparent resin substrate in the another layered product 100-1 faces the substrate, so as to cover from the lower electrode layer 58 to the upper electrode layer 59 on the substrate to obtain a luminescence device 203. Evaluation results of the obtained luminescence device 203 are shown in TAB. 2.

Example 8

FIG. 7 is cross section of luminescence device in Examples 8 in the invention.

Al as lower electrode layer 50 having thickness of 100 nm, lithium fluoride as electron injection layer (no illustration in the figures) having thickness of 1 nm, Alq3 as luminescent-material layer 60 having thickness of 60 nm, allylamine derivative (α-NPD) as positive transport layer (no illustration in the figures) having thickness of 40 nm and ITO as upper electrode layer 51 having thickness of 200 nm were deposited in turn on the layered product 100-1 obtained in EXAMPLE 1 by the same manner as EXAMPLE 3.

Then, the sealing layer 44 was formed by the same manner in EXAMPLE 6 so as to cover from the lower electrode layer 50 to the upper electrode layer 51 on the layered product 100-1 to obtain a luminescence device 204. Evaluation results of the obtained luminescence device 204 are shown in TAB. 2.

Comparative Example 3

A luminescence device was obtained by the same manner as EXAMPLE 6 except that organic film 26 and 27 of EXAMPLE 6 were organic film (not including $SiO_2$) having thickness of 300 nm formed with electron beam by providing alicyclic structure containing polymer at 90 nm/min in a deposition rate. Evaluation results of the obtained luminescence device are shown in TAB. 2.

Comparative Example 4

A luminescence device was obtained by the same manner as EXAMPLE 6 except that 100 sccm (=0.169 Pa·m³/s) in gas flow of tetrafluoroethylene were introduced in vacuum chamber to deposit single layered organic film by plasma CVD process in stead of making sealing layer 44 in EXAMPLE 6. This deposition rate was 90 nm/min and the thickness was 300 nm. Evaluation results of the obtained luminescence device are shown in TAB. 2.

TABLE 2

|  | Emission Life T (hr) | Scratch Resistance (count) | adhesion (piece[s]) | WVTR (g/m²/day) |
|---|---|---|---|---|
| Ex. 3 | 3900 | <5 | 100 | 0.08 |
| Ex. 4 | 3800 | <5 | 100 | 0.1 |
| Ex. 5 | 3900 | <5 | 100 | 0.08 |
| Ex. 6 | 4200 | <5 | 100 | 0.06 |
| Ex. 7 | 4000 | <5 | 100 | 0.08 |
| Ex. 8 | 4000 | <5 | 100 | 0.06 |
| Comp. Ex. 3 | 2500 | 15 | 15 | 0.3 |
| Comp. Ex. 4 | 1500 | 30 | 10 | 0.6 |
| Comp. Ex. 5 | 2000 | 10 | 85 | 0.5 |

Comparative Example 5

A luminescence device was obtained by the same manner as EXAMPLE 6 except that 100 sccm (=0.169 Pa·m³/s) in gas flow of hexamethyldisiloxsan were introduced in vacuum chamber to deposit single layered organic film by plasma CVD process in stead of making sealing layer 44 in EXAMPLE 6. This deposition rate was 90 nm/min and the thickness was 300 nm. Evaluation results of the obtained luminescence device are shown in TAB. 2.

Example 9

FIG. 8 is cross section of luminescence device in EXAMPLE 9 in the invention.

Al (refractive index 3.0) as lower electrode layer 111 having thickness of 100 nm, lithium fluoride as electron injection layer (no illustration in the figures) having thickness of 1 nm, hydroxyquinoline aluminum as luminescent-material layer 112 having thickness of 60 nm, allylamine derivative (α-NPD) as positive transport layer (no illustration in the figures) having thickness of 40 nm and ITO as upper electrode layer 113 having thickness of 200 nm were deposited in turn on the transparent substrate 110 (glass substrate (40 mm×40 mm, 1 mm thickness, refractive index n=1.5) to prepare a circuit for luminescence device. Compulsion heating of the substrate wasn't carried out.

The circuit for luminescence device was set in a vacuum chamber of plasma CVD device with parallel plate electrodes, pressure in the chamber was reduced to 0.1 Pa, 50 sccm (=0.0845 Pa·m³/sec) in gas flow of tetrafluoroethylene (thereafter "$C_2F_4$") and 50 sccm (=0.0845 Pa·m³/sec) in gas flow of hexamethyldisilazane (thereafter "HMDS") were introduced in the vacuum chamber. Then high wave frequency discharge having wave frequency of 13.56 MHz was applied at output of 200 W to the electrode in the vacuum chamber under 30 Pa in pressure to make a film having thickness of 100 nm on the upper electrode layer, which allowed to obtain a luminescence device 205 having a sealing layer 114 so as to touch transparent substrate 110 and lower electrode layer 111. Evaluation results of the obtained luminescence device 205 are shown in TAB. 3.

Example 10

FIG. 9 is cross section of a luminescence device in EXAMPLE 10 in the invention.

A sealing layer 114 was made by the same manner as EXAMPLE 9 except that 25 sccm (=0.0443 Pa·m³/s) in gas flow of $C_2F_4$ and 75 sccm (=0.127 Pa·m³/s) in gas flow of HMDS were introduced in vacuum chamber to make a film having thickness of 100 nm as the first layer (sealing layer 114-1), 50 sccm (=0.0845 Pa·m³/s) in gas flow of $C_2F_4$ and 50 sccm (=0.0845 Pa·m³/s) in gas flow of HMDS were introduced in vacuum chamber to make a film having thickness of 100 nm as the second layer (sealing layer 114-2), and then 75 sccm (=0.127 Pa·m³/s) in gas flow of $C_2F_4$ and 25 sccm (=0.0443 Pa·m³/s) in gas flow of HMDS were introduced in vacuum chamber to make a film having thickness of 100 nm as the third layer (sealing layer 114-3), which allowed to obtain a luminescence device 206 sealed by the sealing layer 114 so that the sealing layer touches transparent substrate 110 and lower electrode layer 111. Evaluation results of the obtained luminescence device 206 are shown in TAB. 3.

[TAB. 3]

TABLE 3

|  | Sealing Layer | | Emission luminance (cd/m²) | Emission Life (hr) | Scratch Resistance | Adhesion (piece[s]) | WVTR (g/m²/day) |
|---|---|---|---|---|---|---|---|
|  | Number of Layers | Refractive Index | | | | | |
| Ex. 9 | 1 layer | 1.65 | 100 | 3000 | <5 | 100 | 0.08 |
| Ex. 10 | 3 layers   1st layer | 1.85 | 180 | 3800 | <5 | 100 | 0.06 |
|  | 2nd layer | 1.65 | | | | | |
|  | 3rd layer | 1.5 | | | | | |
| Comp. Ex. 6 | 1 layer | 1.45 | 90 | 2500 | <5 | 15 | 0.8 |
| Comp. Ex. 7 | 1 layer | 1.9 | 80 | 2500 | 15 | 100 | 0.6 |

Comparative Example 6

A sealing layer having thickness of 100 nm was made by the same manner as EXAMPLE 9 except that 100 sccm (=0.169 Pa·m³/s) in gas flow of $C_2F_4$ alone as material comprised in the sealing layer was introduced in vacuum chamber to obtain a luminescence device sealed by the sealing layer so that the sealing layer touches transparent substrate and lower electrode layer. Evaluation results of the obtained luminescence device are shown in TAB. 3.

Comparative Example 7

A sealing layer having thickness of 100 nm was made by the same manner as EXAMPLE 9 except that 100 sccm (=0.169 Pa·m³/s) in gas flow of HMDS alone as material comprised in the sealing layer was introduced in vacuum chamber to obtain a luminescence device sealed by the sealing layer so that the sealing layer touches transparent substrate and lower electrode layer. Evaluation results of the obtained luminescence device are shown in TAB. 3.

The invention claimed is:

1. A layered product comprising:
   a transparent resin substrate, and
   a sealing film comprising a laminate of at least one monolayer organic film and at least one inorganic film;
   in which the monolayer organic film is made from a raw material which is a combination of an alicyclic structure containing polymer and either a metallic simple substance or a metallic compound;
   wherein the monolayer organic film has a volume ratio of metal atom $\{M\}$/carbon atom $\{C\}$ being 0.01 to 0.99,
   wherein the alicyclic structure containing polymer includes a norbornene based polymer, a polymer comprising a monocycloolefin, a cyclic conjugated diene based polymer, a vinyl alicyclic hydrocarbon polymer, or a hydrogenated polymer thereof; and
   the inorganic film is made from a raw material being a metallic simple substance or a metallic compound.

2. The layered product according to claim 1, in which the organic film has water absorption of no more than 0.1% by weight.

3. The layered product according to claim 1, in which the transparent resin substrate is a film comprising an alicyclic structure containing polymer, wherein the alicyclic structure containing polymer includes a norbornene based polymer, a polymer comprising a monocycloolefin, a cyclic conjugated diene based polymer, a vinyl alicyclic hydrocarbon polymer, or a hydrogenated polymer thereof.

4. A luminescence device comprising:
   a basal plate, a lower electrode layer, a luminescent-material layer, an upper electrode layer and a sealing layer which are laminated in this order;
   in which at least one of the basal plate and the sealing layer comprises the layered product according to claim 1.

5. A luminescence device comprising:
   a basal plate, a lower electrode layer, a luminescent-material layer, an upper electrode layer and a sealing film which are laminated in this order;
   in which the basal plate comprises the layered product according to claim 1, and
   the sealing film comprises a laminate of at least one monolayer organic film and at least one inorganic film;
   in which the monolayer organic film is made from a raw material which is: a) a combination of a fluorine compound and either a metallic simple substance or a metallic compound; or b) an alicyclic structure containing polymer and either a metallic simple substance or a metallic compound, and
   the inorganic film is made from a raw material being a metallic simple substance or a metallic compound.

6. A luminescence device comprising:
   a basal plate, a lower electrode layer, a luminescent-material layer, an upper electrode layer and a sealing film which are laminated in this order;
   in which the sealing film comprises a laminate of at least one monolayer organic film and at least one inorganic film;
   in which the monolayer organic film is made from a raw material which is a combination of an alicyclic structure containing polymer and either a metallic simple substance or a metallic compound, and
   the monolayer organic film has a volume ratio of metal atom $\{M\}$/carbon atom $\{C\}$ being 0.01 to 0.99,
   wherein the alicyclic structure containing polymer includes a norbornene based polymer, a polymer comprising a monocycloolefin, a cyclic conjugated diene based polymer, a vinyl alicyclic hydrocarbon polymer, or a hydrogenated polymer thereof; and
   the inorganic film is made from a raw material being a metallic simple substance or a metallic compound.

7. The luminescence device according to claim 4, of which light transmission within the range of 400 to 800 nm in a wave length is 80% or more during no light emission.

8. The luminescence device according to claim 4, in which the sealing film or the sealing layer has a water vapor transmission rate of 0.1 g/m²/24 hr or less.

9. A plane light-source in which the luminescence device according to claim 4 is installed.

10. A dot matrix display in which the luminescence device according to claim 4 is installed.

11. A liquid crystal display in which the luminescence device according to claim 4 is installed as a back-light unit.

12. A layered product comprising:
    a transparent resin substrate, and
    a sealing film comprising a laminate of at least one organic film and at least one inorganic film;
    in which the organic film is made by physical vapor deposition, sputtering deposition or chemical vapor deposition of a raw material being an alicyclic structure containing polymer and either a metallic simple substance or a metallic compound at the same time, and
    the monolayer organic film has a volume ratio of metal atom $\{M\}$/carbon atom $\{C\}$ being 0.01 to 0.99,
    wherein the alicyclic structure containing polymer includes a norbornene based polymer, a polymer comprising a monocycloolefine, a cyclic conjugated diene based polymer, a vinyl alicyclic hydrocarbon polymer, or a hydrogenated polymer thereof; and
    the inorganic film is made from a raw material being a metallic simple substance or a metallic compound.

* * * * *